Sept. 2, 1941. J. W. STEVENSON 2,254,550
BOX STACK DUMPER
Original Filed Jan. 11, 1937   3 Sheets-Sheet 1

Inventor
JAMES W. STEVENSON,
By
Attorney

Inventor
JAMES W. STEVENSON,
By Hubert A. Huebner
Attorney

Sept. 2, 1941.　　　J. W. STEVENSON　　　2,254,550
BOX STACK DUMPER
Original Filed Jan. 11, 1937　　　3 Sheets-Sheet 3

Inventor
JAMES W. STEVENSON,
By Herbert A. Huebner
Attorney

Patented Sept. 2, 1941

2,254,550

UNITED STATES PATENT OFFICE 2,254,550

BOX STACK DUMPER

James W. Stevenson, Riverside, Calif.; Gladys Stevenson, administratrix of said James W. Stevenson, deceased Original application January 11, 1937, Serial No. 119,989. Divided and this application April 3, 1939, Serial No. 265,655

2 Claims. (Cl. 214—1.1)

This invention relates to the art of article handling and particularly to the handling of loaded and empty boxes.

While useful in many industries, this invention has particular utility in the citrus industry in which fruit is handled in boxes during the harvest and in packing the fruit. For purposes of illustration, therefore, an embodiment of the invention designed for use in citrus packing houses is disclosed herein.

Citrus fruits are harvested by being picked from the trees by hand and are brought to the packing house from the groves in what are known as field boxes. At the packing house these loaded boxes are taken from the truck and stacked on the floor in stacks generally ranging from five to eight boxes high. When it is desired to remove the fruit from these boxes and run it through a series of treatments by which it is prepared for shipping and market, the fruit must be dumped from the boxes containing it and the empty boxes delivered to empty box storage. Clamp trucks are provided by which an entire stack of boxes can be easily handled and moved from place to place on the packing house floor by a single worker.

It is an object of my invention to provide a machine to which loaded boxes may be delivered in the form of stacks and which will dump the contents from the boxes in these stacks into suitable bins or conveyors.

In stack dumpers previously in use, there has always been a pause between the dumping of the last box in a given stack and the first box in the next stack which is longer than the interval between the dumping of successive boxes in each stack. This resulted in irregular feeding of fruit to the various machines for treating it, with corresponding decrease in efficiency in these machines.

It is therefore another object of my invention to provide a stack handling device which will deliver individual boxes of series of stacks successively to a box dumper or other mechanism so that the interval between the delivery of the last box of each stack and the first box in the next succeeding stack is the same as the intervals between the delivery of successive boxes in a given stack.

This application is a division of my copending application filed January 11, 1937, Serial No. 119,989. In that application I have illustrated and described a box stack dumper and restacker as these two units may be utilized in conjunction to unstack and dump loaded boxes and after conveying the empty boxes to a suitable point restacking them. My claims in that case relate to the restacker. In the present case the claims are directed to the unit which handles the stacks of loaded boxes and dumps their contents. For this reason it is not necessary to illustrate and describe both units of the apparatus, as the box stack dumper will operate independently of the restacker. I have therefore shown here and will describe only the box stack dumper.

The manner of accomplishing the foregoing objects, as well as further objects and advantages, will be made manifest in the following description taken in connection with the accompanying drawings, in which.

Figure 1:
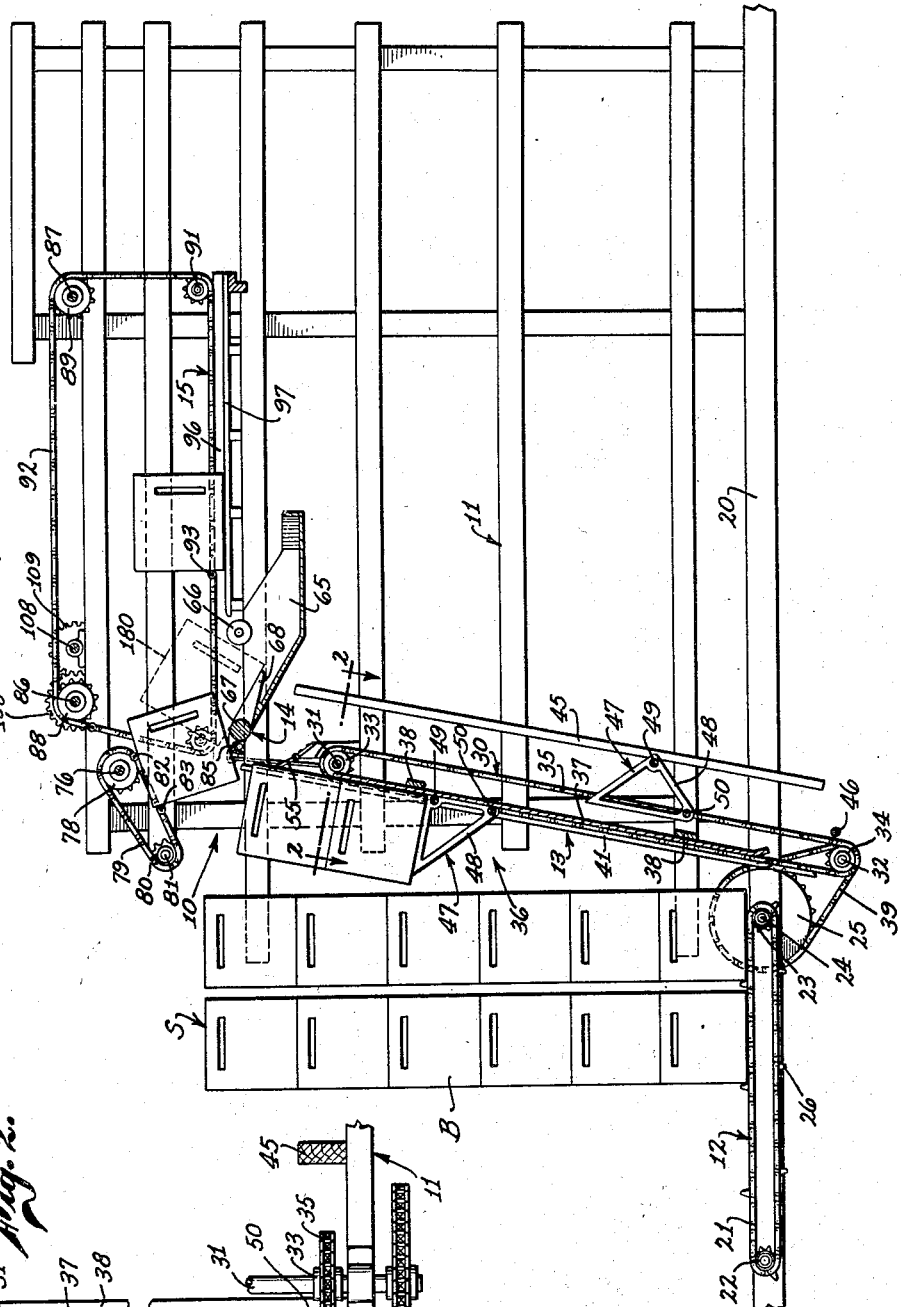
Figure 1 is a diagrammatic cross sectional view of a preferred embodiment of my invention.

Referring to the drawings, my box stack dumper is indicated generally at 10, which includes a frame 11, a loaded stack feed conveyor 12, a stack elevator 13, a box dumping mechanism 14, and a conveyor 15 for removing empty boxes from the dumper 14 and delivering these to a stacker or any other desired destination.

*The stack feed conveyer 12*

The stack feed conveyer 12 is mounted in a floor 20 upon which the frame 11 rests and comprises a pair of chains 21 which pass around idle sprockets 22 and drive sprockets 23, the latter being fixed on stub shafts 24 with driven sprockets 25. Provided on the chains 21 are stack spacing lugs 26.

*The stack elevator 13*

The stack elevator 13 includes an endless chain mechanism 30 having a drive shaft 31, stub shafts 32, and sprockets 33 and 34 fixed on these respective shafts about which sprockets are trained endless chains 35. Fixed on the shafts 32 and disposed outwardly from the sprockets 34 are drive sprockets (not shown) which are connected by endless chains 39 with the driven sprockets 25 so that whenever the sprockets 34 are rotated by the chains 35, the sprockets 25 are also rotated thus setting in motion the box stack feed conveyer 12. The chain mechanism 30 is mounted so as to be inclined away from the stack conveyer 12.

The space just in advance of endless chain mechanism 30 may be termed a stack elevating path 36. Bordering this path and located between the endless chains 35 just back of the path 36 is an inclined back plate 37 which is supported on the frame 11 by members 38. Also mounted on the frame 11 and extending substantially parallel with the foremost flights of the chains 35 are guides 41. Spaced back of the chains 35 are provided guides 45 which are secured upon the frame 11.

Figure 2:
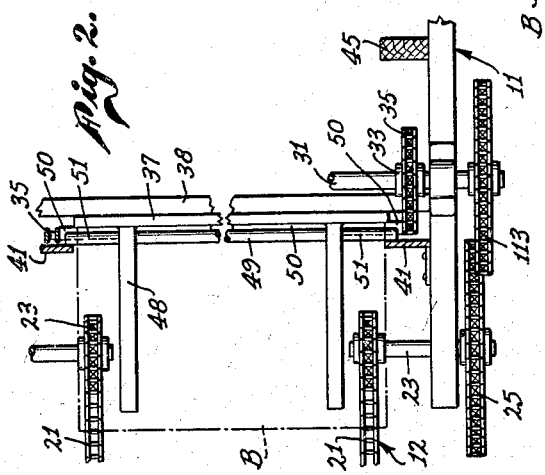
Figure 2 is a cross sectional view taken on the line 2—2 of Figure 1.

The stack elevator 13 also includes two stack lifting cradles 47 each of which comprises a pair of right triangular frames 48 which are connected at their right angular vertices by a cross bar 49. The lower vertices of the triangular frames 48 are connected by a cross bar 50, the extending ends of which are pivotally connected to the chains 35 so that each of the cradles 47 is supported on these chains. Extending ends of the bar 49 form guide pins 51 which slide against inner faces of guides 41 as shown in Figure 2.

Figure 7:
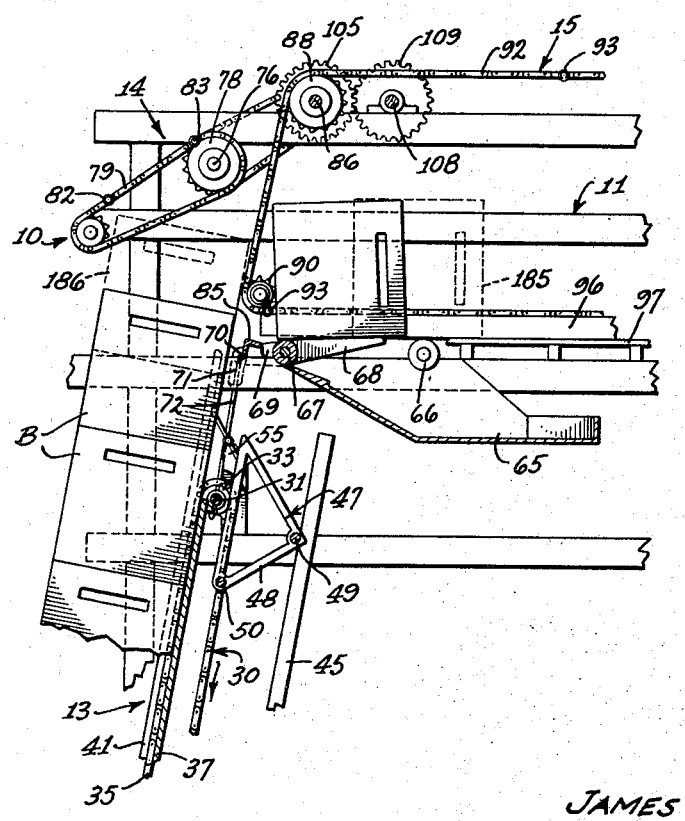
Figure 7 is an enlarged fragmentary cross sectional view illustrating additional steps to those shown in Figure 1 of the dumping of a box and just after a new stack has been received into the machine.

When the chains 35 are caused to traverse their endless pathway by the rotation of shaft 31, each of the cradles 47 is caused to travel upwardly when it is disposed in the path 36, the cross bars 49 and 50 being guided at this time between the back plate 37 and the inner edge portions of the guides 41. During this upward travel of a particular cradle 47, the center of gravity of that cradle, as well as any weight which may be imposed on it, maintains the pins 51 of such cradle pressed against the inner edge portions of the guides 41. Thus, as this cradle is propelled upwardly above the sprocket 31, it remains in the same rising position in which the rising cradle is shown in Figure 1 until the pins 51 thereof engage traps 55 which start rocking this cradle rearwardly. The frames 48 of this cradle then engage the shaft 31 causing the cradle to flop backward until the pins 51 engage guides 45 as shown in Figure 7.

Approaching the lower end of the chains 35, the downwardly moving cradle 47 is swung forwardly by engagement of the cradle frames 48 with a fixed bar 46. The center of gravity of the descending cradle 47 thus shifts forward of the cross bar 50 of this cradle with the result that the cradle swings over until the pins 51 thereof engage the lower ends of the guides 41. A complete cycle of travel of one of the cradles 47 has now been described.

The dumping mechanism 14

Figure 3:
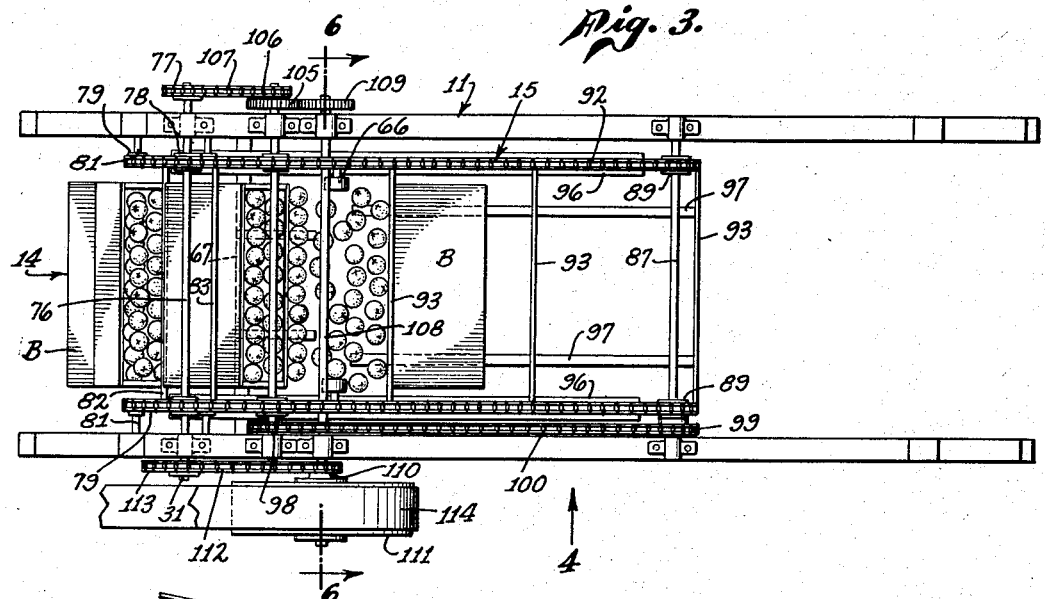
Figure 3 is a plan view of the upper portion of Figure 1 showing the drive mechanism.

The dumping mechanism 14 includes a fruit receiving hopper 65 above which is supported a pair of rollers 66 and a roller 67 having arms 68 which are normally inclined downwardly. The roller 67 has a short arm 69 extending in the opposite direction from the arms 68; the arm 69 having a pin 70 which is trapped in an elongated eye 71 of a link 72, the lower end of which is pivoted on a short arm 73 fixed on a free end of the shaft 31 (see Figures 1 and 5). Journaled on the frame 11 (see Figures 1, 3 and 4) is a shaft 76 having a drive sprocket 77 and driven sprockets 78, the latter being connected by short endless chains 79 to small sprockets 80 mounted on stub shafts 81. Carried between the two chains 79 are dumping bars 82 and 83. An angle iron fulcrum bar 85 is fixed on the frame just outwardly from and on the same level as the roller 67.

The empty box conveyer 15

The empty box conveyer 15 includes shafts 86 and 87 which are journaled on the frame 11 and provided with sprockets 88 and 89. Mounted on suitable stub shafts so as to be in alignment with the sprockets 88 and 89 are small sprockets 90 and 91, endless chains 92 encircling the sprockets thus in alignment. Carried by the chains 92 are a plurality of empty box conveying bars 93. Provided on the frame 11 are guide rails 97 for supporting a box while it is being conveyed by one of the bars 93. For driving purposes the shafts 86 and 87 are connected by sprockets 98 and 99 rigidly fixed on these shafts and an endless chain 100 encircling these sprockets. It might also be pointed out here that the sprockets 88 are loosely mounted on the shaft 86 and the sprockets 89 are fixed upon the shaft 87.

Fixed on the rear end of shaft 86 is a spur gear 105 and a sprocket 106, the latter being connected with the sprocket 77 by a chain 107. Journaled in suitable bearings provided on the frame 11 is a shaft 108 having a spur gear 109 at one end which meshes with the spur gear 105 and at the opposite end a sprocket 110 and a drive pulley 111. The sprocket 110 is connected by an endless chain 112 to a sprocket 113 mounted on the front end of the shaft 31. The entire machine 10 is adapted to be driven by any suitable prime mover (not shown) by rotating the pulley 111 as by a belt 114.

Operation

Figure 4:
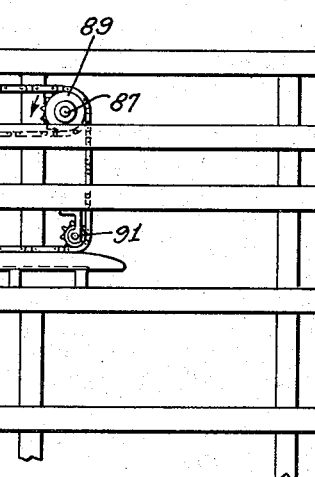
Figure 4 is a side elevational view of Figure 3 taken in the direction of the arrow 4 and illustrating that portion of the drive mechanism on that side of the machine.
Figure 5:
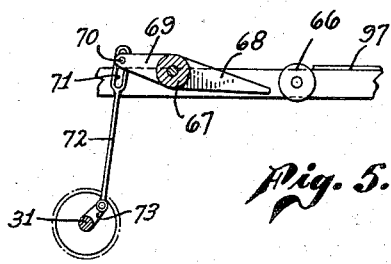
Figure 5 is a diagrammatic fragmentary detail view of a rest disposed as when supporting a box in dumping position.
Figure 6:
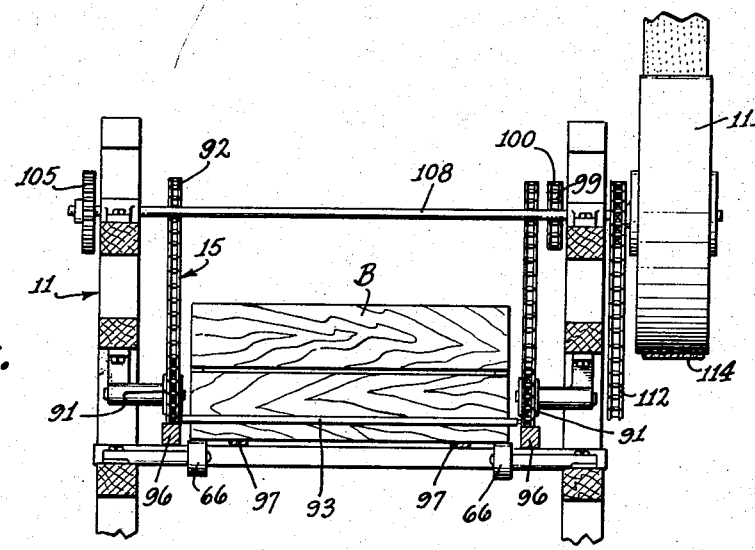
Figure 6 is a cross sectional view taken on the line 6—6 of Figure 3.

To set in operation the box stack dumper 10, power is applied through the belt 114 to the pulley 111 so as to rotate the latter in the direction indicated by the arrows in Figure 4. This rotates the shaft 108 which through the sprockets 110 and 113 and the chain 112 rotates the shaft 31 which sets in motion both the stack elevator 13 and the stack feeder 12. Also, through the gears 109 and 105 the sprockets 106 and 77, and the chain 107, the box dumping mechanism 14 is set in operation. As already noted, the rotation of the shaft 86 by the gears 109 and 105 transmits power through the sprockets 98 and 99 and chain 100 to the shaft 87, thus causing the conveyer 15 for removing empty boxes to be set in operation.

When the machine 10 has thus been started, the attendant trucks stacks of loaded boxes S from their place of storage on the floor of the packing house and sets these down on the chains 21 of the feed conveyer 12 between the lugs 20 as shown in Figure 1. The lugs 20 are so spaced on the chains 21 that these stacks S are successively delivered, with the lowermost box in the stack extending into the elevating path 36, just as one of the cradles 47 rises upwardly into position to support this stack, tilts it into position in the path 36 against the back plate 37, and starts elevating it upwardly towards the box dumping mechanism 14. The latter mechanism is so timed that as each of the boxes B in a stack S being thus elevated comes into a certain position relative to the dumping mechanism, which may be termed a "dumping position," the bar 82 engages the side of this box and starts to tip it toward the right against angle iron fulcrum bar 85. As the bar 82 completes its tilting action on the side of this box, the bar 83 comes into play against the bottom of the box and continues the rocking of the latter with the result that the box is dumped over completely on its side, coming to rest temporarily in the position shown in broken lines 180 in Figure 1.

After the box under discussion has remained in the position 180 a sufficient length of time for the fruit to gravitate entirely therefrom into the hopper 65, the arms 68 are lifted by the downward movement of the short arm 73 and the engagement of the upper end of the eye 71 with the pin 70 as shown in Figure 7 in full lines. This lifts the box just as one of the cross bars 93 moves into contact with the empty box so that the latter is immediately shifted, as indicated by the broken lines 185 in Figure 7, onto the rollers 66 and empty box rails 97.

As the first of the boxes is thus dumped and the empty box is carried away by one of the bars 93, the next box of the stack is being lifted upwardly into dumping position which is indicated by the broken lines 186 in Figure 7. As the box reaches this position the cross bar 82 moves into contact with the adjacent side of the box so as to initiate the dumping of this box as already described for the first box. In this manner the boxes of the stack S are successively elevated and dumped and the empty boxes propelled by conveying bars 93 of the conveyor 15 along the empty box rail 97 towards a stacker such as illustrated and described in my aforesaid copending application or to any other desired destination. For such purpose, the rails 97 and chains 92 may be lengthened to extend to remote points in the packing house if necessary.

It is to be noted that the relatively rapid retraction of each of the cradles 47 from out of the path 36 just after the lowermost box of each stack has been delivered to the dumping mechanism 14 permits the next succeeding stack S to be tilted into place in the elevating path 36 so that the topmost box of the new stack is lifted into dumping position and is dumped with the same time interval between this and the dumping of the lowermost box of the preceding stack as elapses between the dumping of successive boxes in a given stack. Thus the dumping of fruit in the operation of my machine 10 is at a uniform rate, there being no fluctuation in the interval between the dumping of successive boxes so long as the feed conveyer 12 is kept supplied with stack S.

While I have shown and described a preferred form of box stack dumper designed for a citrus fruit packing house, the invention is applicable to numerous other adaptations.

What I claim is:

1. In combination: means for delivering a loaded box in a dumping position; endless chain means; a pair of bars on said chain means; the first of said bars contacting a side of said box when in dumping position so as to tilt said box, the second of said bars then contacting the bottom of said box to continue the tilting of said box past its center of gravity to dump the contents of said box; and means for conveying the empty box away.

2. A combination as in claim 1 in which the said loaded box delivery means comprises a stack elevator which elevates a stack of boxes so as to deliver the boxes of said stack successively to said dumping position.

JAMES W. STEVENSON.